Jan. 12, 1937.  R. W. KNAPP ET AL  2,067,195
BATTERY CABLE TERMINAL
Filed Aug. 13, 1934
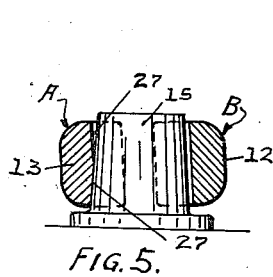
FIG. 5.
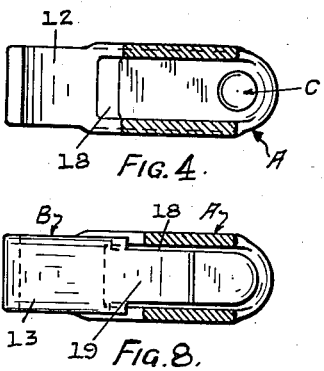
FIG. 4.
FIG. 8.
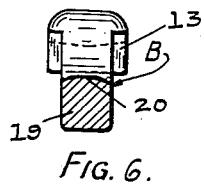
FIG. 6.
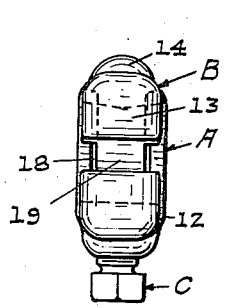
FIG. 2.
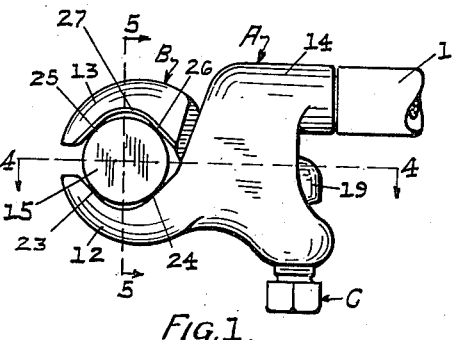
FIG. 1.
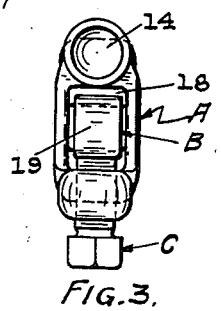
FIG. 3.
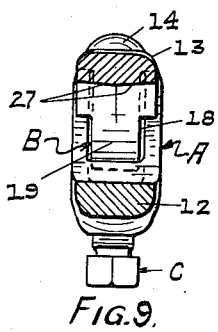
FIG. 9.
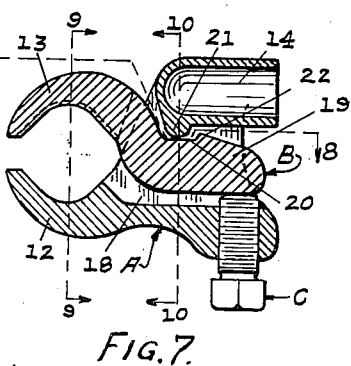
FIG. 7.
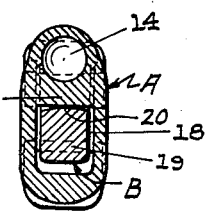
FIG. 10.
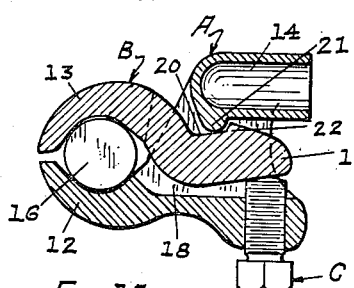
FIG. 11.
INVENTORS
ROLAND W. KNAPP
BY ARTHUR D. LUND
ATTORNEY Patented Jan. 12, 1937

2,067,195

UNITED STATES PATENT OFFICE 2,067,195

BATTERY CABLE TERMINAL

Roland W. Knapp, Wayzata, and Arthur D. Lund, Minneapolis, Minn., assignors of one-third to William C. Schroder, Minneapolis, Minn.

Application August 13, 1934, Serial No. 739,566

6 Claims. (Cl. 173—259)

This invention relates to terminal devices for releasably connecting electric cables to batteries, and the primary object is to provide an efficient, practical, and comparatively simple, sturdy, and easily operated device of that character which will overcome several objections in and be far superior to devices now conventionally in use as well as others which have come to our attention. More specifically it is our purpose to provide a terminal device that will have certain feature advantages among which are, that it will have a four point, self-adjusting line contact with the battery post, regardless of size, taper, or condition of the post; it can be applied either side up, and will permit the cable to lead off at any desired direction without interfering with the adjacent filler cap of the battery; it has no fulcrum pivot subject to corrosive action, and the pressure screw is at a maximum distance from the post and source of corrosive influence; the design of the two parts is such as to simplify casting and insures smoothness without machining or grinding, except for the tapping of one bolt hold, and this in turn assures retention of the outer scale, formed in the casting operation, thus strengthening the members against both physical stresses as well as chemical reactions; the entire pressure of the pressure screw is applied to the post contacts, the fulcrum offers no resistance to the application of the screw pressure, and the screw is so arranged that applied pressure will not cause a twisting strain on the battery post tending to loosen the post seal and thereby permitting corroding battery acids to escape; sufficient clearance is provided in one member and about the other to permit freedom of adjustments and to provide recesses for grease to retard or prevent corrosion; the device is easily and quickly released and eliminates the necessity of prying or wedging to remove it from the post; the pressure screw serves to prevent separation of the parts except when retracted to a maximum extent. These and still other objects, purposes, and advantages, will be disclosed in the course of the following specification, reference being had to the accompanying drawing, wherein:

Fig. 1 is a plan view of the terminal device showing it as attached to the end of a cable, and applied to a battery post of comparatively large size.

Fig. 2 is an end view of the terminal as seen from the left in Fig. 1.

Fig. 3 is an end view of the terminal as seen from the right in Fig. 1, and with the cable element removed.

Fig. 4 is a sectional plan view of the main body member of the terminal, as shown on the line 4—4 in Fig. 1, and with the clamping tongue and battery post removed.

Fig. 5 is a cross sectional, detail elevation as seen on the line 5—5 in Fig. 1, the clamping jaws being shown in section but the battery post being shown in full.

Fig. 6 is a sectional, detail view through the clamping tongue, separated from the body casting proper, and as seen on the line 10—10 in Fig. 7.

Fig. 7 is a sectional, plan view taken centrally and horizontally through the device, in this case the battery post and cable elements being removed.

Fig. 8 is a sectional view as seen on the irregular line 8—8 in Fig. 7.

Fig. 9 is a sectional view on the line 9—9 in Fig. 7.

Fig. 10 is a sectional view on the line 10—10 in Fig. 7.

Fig. 11 is a sectional, plan view similar to Fig. 7 but showing the device as applied to a small size of battery post, in which event the clamping tongue automatically assumes a slightly outwardly shifted position so that proper contacts may result as between the clamping jaws and the battery post.

Referring to the drawing more particularly and by reference characters, A and B generally designate the two main elements which, with a pressure screw C, compose the terminal embodying the invention. The members A and B are provided with co-operating jaws 12 and 13, respectively, for engaging battery posts, such as 15 or 16, and the member A is further provided with an integral socket portion 14, into which is sweated or otherwise secured the end of the conductor cable 17. The two terminal members A and B are preferably cast from hard bronze and may be lead coated to further resist corrosion. In any event the piece B has substantial clearance and freedom of movement, when not in clamping condition, in the recess 18 which extends through the member A, and with the pieces A and B designed substantially as shown there will be no occasion for machining or fitting, and consequently this will not only reduce production costs, but will also preserve the relatively harder outer casting surfaces, with the advantages already noted.

Continuing from the jaw 13 the member B has a relatively narrower shank 19 which extends through the recess 18, and to the screw C for operation thereby. At an intermediate point the shank 19 has a recessed bearing surface 20 for limited tilting and sliding contact with a bearing lug 21 which is integral with the socket member 14 and extends into the recess 18. As shown in Figs. 6 and 10, the surface 20 is preferably curved, transversely, to permit slight tilting action of the members A and B with respect to each other. Adjacent the bearing surface 20 the shank 19 is provided with a shoulder 22 which is of such size as to prevent removal of the piece B from the recess 18 except when the screw C has been retracted sufficiently to give the required clearance.

The reason for providing limited lengthwise movement of the piece B in the recess 18 is to insure proper and uniform clamping contact as between the jaws 12—13 and the battery post 15 (or 16), which is a most important consideration in the making of a successful terminal for use on different sizes of battery posts. Thus, when the device is applied to a comparatively large post, such as shown at 15 in Figs. 1 and 5, the member B will assume the position shown in Fig. 7, and when applied to a smaller size of post, such as shown at 16 in Fig. 11, the member B will move slightly outwardly or forwardly, it being understood that the piece will move according to the automatic or self-fitting action of the jaw 13 on the post 16 (or 15), which post will in turn also be self-fitting or self-centering in the jaw 12.

It will be noted that the jaws 12 and 13 are not necessarily curved to form a surface fit with any particular size of post, but are preferably provided with angularly arranged faces for tangential engagement with the posts to form vertical lines of contact therewith. Thus as shown in plan in Fig. 1, the jaw 12 contacts the post 15 on vertical line points 23 and 24, while jaw 13 contacts at points 25 and 26. The contacts thus made are found to be more positive as current conductors than uniform face contacts, and are also superior to the latter because they will adapt themselves and maintain the four points of engagement on various sizes of posts, as evidenced by the disclosure in Fig. 11.

It will be noted also, with particular reference to Figs. 1, 5, and 9, that the jaw 13 has its post contact face slightly beveled both upwardly and downwardly from its median line, as at 27, so as to allow for adaptation to various tapers of posts when the screw C is tightened. This adaptation to taper by the jaw 13 is permitted by virtue of the play of the piece B in recess 18, and by the curvature of the shank surface 20 bearing on fulcrum lug 21.

It will thus be seen that when the terminal is applied to a battery post, and the screw C tightened, the jaws 12 and 13 will not only merely grip the post, as is the case with many terminal devices now in use, but will do so with a maximum degree of efficiency and satisfaction. Attention is also directed to the ease with which the device may be removed from the battery. Even a most aggravated condition of corrosion will not cause sticking or "freezing" of parts. With the pressure screw released the device is readily removable without prying, wedging, or pounding. Should the jaws 12—13 proper occasionally stick to the post surface, a screw driver point or other tool inserted between the outer jaw ends and given a slight twist will immediately free them. Should it be necessary, prior to reapplying and greasing the terminal, to clean it of dirt, acid, or other foreign matter, it is only necessary to loosen the screw enough to permit shoulder 22 to pass under lug 21 whereupon total separation and cleaning becomes a very simple matter.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A terminal device for connecting a cable to a battery post, comprising a pair of members disposed in a plane perpendicular to the axis of the post and having jaws at one end for gripping the post, a fulcrum tiltably connecting the members intermediate their ends, means at the ends of the members opposite from their jaws to actuate the members to exert a clamping pressure to the jaws, one of said members having freedom for lengthwise sliding movement and limited transverse rocking movement with respect to the fulcrum connection with the other member, and one of said jaws having upper and lower post engageable faces which respectively converge toward the post from the upper and lower extremities of the jaw, whereby one of said faces may conform to the adjacent vertical contour of the post under said limited transverse rocking movement and when said clamping pressure is applied.

2. A terminal device for connecting a circuit element to a battery post, comprising a pair of members having cooperating post engaging jaws at one end, one of said members having an aperture for longitudinally receiving the other member and so that the apertured member will completely encircle the other member in a transverse plane, said members being provided, at the side of the second member opposite from the post engaging side, with cooperating lug and notch connection forming a lateral fulcrum for the second member with respect to the apertured member, and a pressure screw, threaded in the end of one of the members opposite the jaw end, for engagement with the adjacent end of the other member to close the jaw ends toward each other and for maintaining the lug and notch connection to prevent longitudinal displacement of the members with respect to each other.

3. A terminal device for connecting a cable to a battery post, comprising a pair of members one of which has an integral cable socket and is provided with a longitudinal hole or aperture extending therethrough to receive and tiltably maintain the other, said hole or aperture being defined by integral member parts extending about so as to entirely encircle the other member, said members being formed at forward ends with cooperating post engaging jaws, a screw threaded in the rear end of one of the members for engagement with the corresponding rear end of the other member to spread said rear ends and thereby convey clamping pressure to the post engaging jaws, and a fulcrum lug integral with the first mentioned member and projecting into the recess adjacent the socket for bearing contact against a side edge surface of the other member.

4. A terminal device for connecting a cable to a battery post, comprising a pair of members one of which has an integral cable socket and is provided with a longitudinal hole or aperture extending therethrough to receive and tiltably maintain the other, said hole or aperture being defined by integral member parts extending about so as to entirely encircle the other member, said members being formed at forward ends with cooperating post engaging jaws, a screw threaded in the rear end of one of the members for engagement with the corresponding rear end of the other member to spread said rear ends and thereby convey clamping pressure to the post engaging jaws, and a fulcrum lug integral with the first mentioned member and projecting into the recess adjacent the socket for bearing contact against a side edge surface of the other member, said side edge surface of the other member having a lateral notch to receive the fulcrum lug and retain the second member against longitudinal displacement in the aperture.

5. A terminal device for connecting a cable to a battery post, comprising a pair of members one of which has an integral cable socket and is provided with a longitudinal hole or aperture extending therethrough to receive and tiltably maintain the other, said hole or aperture being defined by integral member parts extending about so as to entirely encircle the other member, said members being formed at forward ends with cooperating post engaging jaws, a screw threaded in the rear end of one of the members for engagement with the corresponding rear end of the other member to spread said rear ends and thereby convey clamping pressure to the post engaging jaws, and a fulcrum lug integral with the first mentioned member and projecting into the recess adjacent the socket for bearing contact against a side edge surface of the other member, said side edge surface of the other member having a lateral notch to receive the fulcrum lug and retain the second member against longitudinal displacement in the aperture, and said notch being wider than the width of the lug, in a section longitudinally through the device, to permit freedom for limited longitudinal movement of the second member in the aperture and self adjustment of the jaws about the battery post.

6. A terminal device for connecting a cable to a battery post, comprising a pair of members one of which has an integral cable socket and is provided with a longitudinal hole or aperture extending therethrough to receive and encircle the other member, said members being provided, forwardly of the recess, with cooperating post engaging jaws, the first mentioned of said members being provided, adjacent the cable socket and within the aperture, with an integral lug having lateral fulcrum contact with one side surface of the other member, pressure means for forcibly tilting the second mentioned member on said fulcrum lug to close the jaws toward each other, one of the contact surfaces between the lug and said second member being curved in cross section to provide freedom for limited relative rocking movement of the second member in the aperture, to thereby obtain uniform jaw contact lengthwise on a tapered battery post.

ROLAND W. KNAPP.
ARTHUR D. LUND.